(12) United States Patent
Burke et al.

(10) Patent No.: US 10,425,308 B2
(45) Date of Patent: Sep. 24, 2019

(54) LATENCY MEASURER

(71) Applicant: HEWLETT PACKARD ENTERPRISE DEVELOPMENT LP, Houston, TX (US)

(72) Inventors: Paul M Burke, Bedford, NH (US); Yi Cheng, Palo Alto, CA (US); Ruben Rodriguez Alvarez, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/738,099

(22) PCT Filed: Jul. 1, 2015

(86) PCT No.: PCT/US2015/038775
§ 371 (c)(1),
(2) Date: Dec. 19, 2017

(87) PCT Pub. No.: WO2017/003475
PCT Pub. Date: Jan. 5, 2017

(65) Prior Publication Data
US 2018/0183694 A1  Jun. 28, 2018

(51) Int. Cl.
*H04L 12/26* (2006.01)
*H04L 12/841* (2013.01)

(52) U.S. Cl.
CPC ........ *H04L 43/0858* (2013.01); *H04L 43/087* (2013.01); *H04L 43/106* (2013.01); *H04L 43/12* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 7,508,769 B1 | 3/2009 | Duffield et al. | |
| 8,208,389 B2 | 6/2012 | Alaria et al. | |
| 9,843,520 B1* | 12/2017 | Haltore | H04L 47/125 |
| 2002/0093917 A1* | 7/2002 | Knobbe | H04L 1/24 |
| | | | 370/252 |
| 2003/0046388 A1 | 3/2003 | Milliken | |
| 2003/0088671 A1 | 5/2003 | Klinker et al. | |
| 2003/0223367 A1 | 12/2003 | Shay et al. | |

(Continued)

FOREIGN PATENT DOCUMENTS

| | | |
|---|---|---|
| WO | WO-2013181690 A1 | 12/2013 |
| WO | WO-2016175957 A1 | 11/2016 |

OTHER PUBLICATIONS

International Search Report and Written Opinion, International Application No. PCT/US2015/038775, dated Mar. 25, 2016, pp. 1-12, KIPO.

(Continued)

*Primary Examiner* — Jutai Kao
(74) *Attorney, Agent, or Firm* — Hewlett Packard Enterprise Patent Department

(57) ABSTRACT

In some described examples, a latency measurer receives packets from a tapping point. The packets may comprise wrapped packets including a wrapper header. The wrapper header may include a capture timestamp, a tapping point identifier, packet address and port information, and a message content hash.

16 Claims, 6 Drawing Sheets

(56) References Cited

U.S. PATENT DOCUMENTS

| | | |
|---|---|---|
| 2004/0105391 A1 | 6/2004 | Charcranoon |
| 2004/0117478 A1* | 6/2004 | Triulzi ................ H04L 63/1416 |
| | | 709/224 |
| 2012/0188874 A1* | 7/2012 | Kumagai ............ H04L 47/2441 |
| | | 370/235 |
| 2012/0230186 A1 | 9/2012 | Lee et al. |
| 2013/0322255 A1 | 12/2013 | Dillon |
| 2014/0269269 A1 | 9/2014 | Kovvali et al. |
| 2014/0286174 A1 | 9/2014 | Iizuka et al. |
| 2016/0234083 A1* | 8/2016 | Ahn ..................... H04L 43/026 |

OTHER PUBLICATIONS

Ramana Rao Kompella et al., "Router Support for Fine-Grained Latency Measurements," IEEE/ACM Transactions on Networking, Jun. 2012, pp. 811-824, IEEE.

Extended European Search Report, EP Application No. 15897353.7, dated Feb. 6, 2018, pp. 1-11, EPO.

* cited by examiner

LATENCY MEASURER

BACKGROUND

Communication service providers are moving from switched services to Internet Protocol (IP) based services via Long Term Evolution (LTE). This transition includes the implementation of Voice over LTE (VoLTE) using Voice over IP (VoIP) and IP Multimedia Subsystem (IMS) signaling techniques. Key aspects of VoLTE service delivery include the ability to deliver network performance that meet the latency requirements for successful delivery of VoIP services like high definition voice. Measuring packet latency supports many aspects, such as improvements in network design, network redesign or expansion efforts, realtime policy function adjustment, and other network adjustments to support the requirements.

BRIEF DESCRIPTION OF THE DRAWINGS

Certain examples are described in the following detailed description and in reference to the drawings, in which.

DETAILED DESCRIPTION OF SPECIFIC EXAMPLES

Implementations of the described technology may allow measurement of packet latency through a network. For example, the technology may be deployed to measure packet latency through an LTE Evolved Packet Core (ePC). In some implementations, copies of a packet may be captured at various tapping points as the packet traverses the network. For example, tapping points may be located before and after an eNodeB, an Evolved Packet Data Gateway (ePDG), a Serving Gateway (S-GW), or a Packet Data Network Gateway (P-GW) in an ePC. The copied packets may be wrapped in a header containing information used by a correlation system to track the packet throughout the network.

Figure 1:
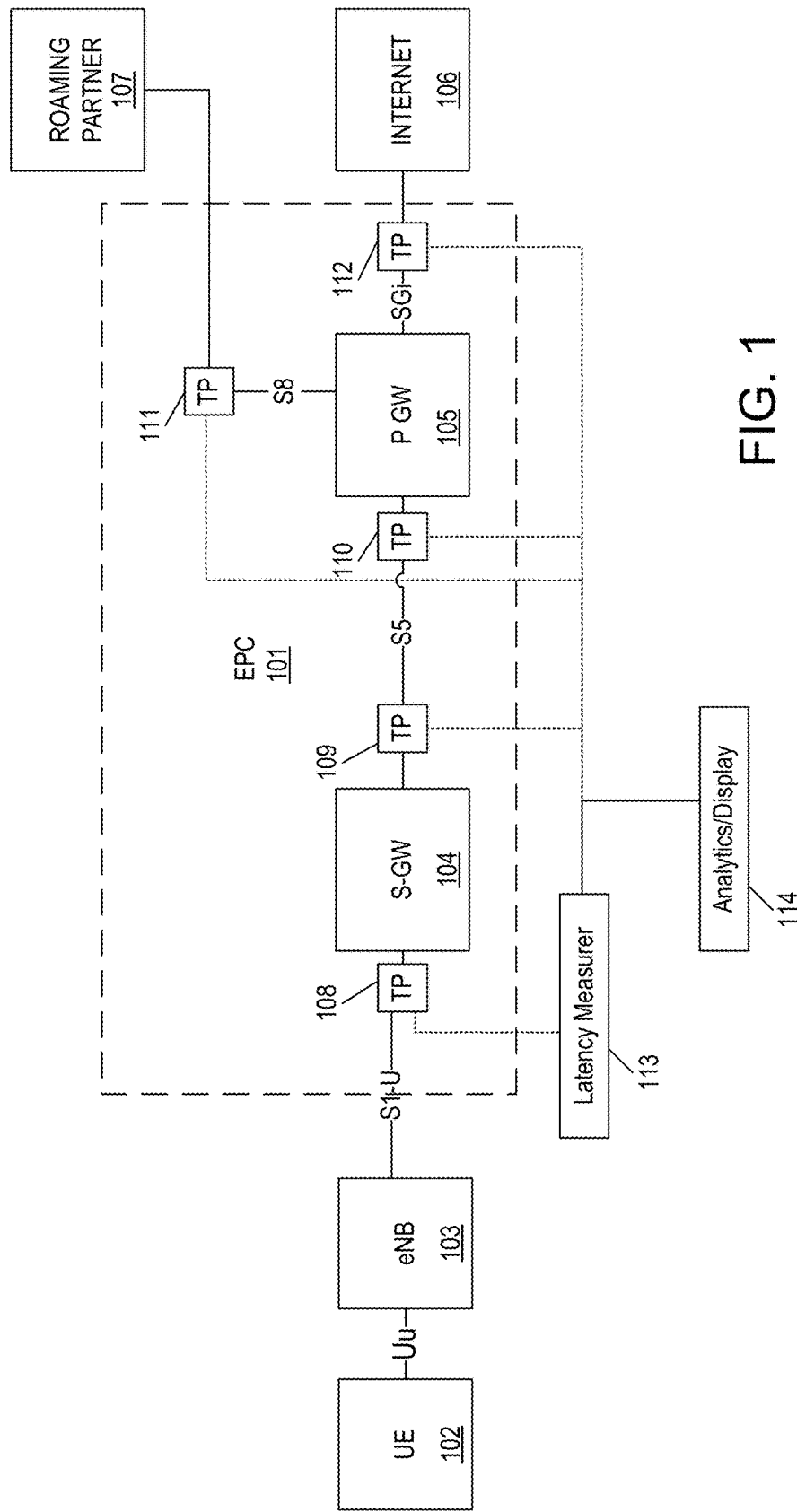
FIG. 1 illustrates an example deployment of a latency measurer and a set of tapping points in an ePC.

FIG. 1 illustrates an example deployment of a latency measurer 113 and a set of tapping points 108-112 in an ePC 101. In various implementations, the tapping points 108-112 may be implemented as separate network elements in the measured network or may be implemented by configuring existing network elements. For example, tapping points 108-112 may be implemented as network switches, such as software defined network (SDN) network switches, such as OpenFlow switches. As another example, tapping points 108-112 may be implemented using the hardware present on the network elements 104-105. For example, tapping points 108-112 may be implemented by configuring network interface cards on the elements 104-105 to copy packets, wrap the packets with the wrapper headers, and forward the copies to the latency measurer 113.

In the illustrated example, the ePC 101 may comprise one or more S-GWs 108, connected to respective e Node Bs (eNB 102) of E-Utran access networks via S1-U interfaces. The eNB 102 may connect to a user equipment 102 (UE), such as a smartphone or other mobile device via the LTE Uu (LTE radio interface). Packets sent between the eNB 103 and the S-GW 104 are intercepted by tapping point 108 and sent to a latency measurer 113. In some implementations, tapping points may also be placed around the eNB 103 to intercept packets on the LTE-Uu and S1-U interfaces.

The ePC 101 may further comprise a P-GW 105. For example, the P-GW 105 may connect to a roaming partner network 107 via an S8 interface. For example, the UE 102 may be a home UE to the network 107 and be currently roaming on network 101. The P-GW 105 may further connect to an external data network, such as the Internet 106, via an SGi interface. In the example, a tapping point 110 intercepts packets on the S5 interface, a tapping point 111 intercepts packets on the S8 interface, and a tapping point 112 intercepts packets on the SGi interface.

The tapping points 108-112 intercept and copy packets during their normal traversal of the networks and send those copies to latency measurer 113. The copies are wrapped by the tapping point 108-112 with a header comprising information elements used by the latency measurer 113 to track the packet as it traverses the EPC 101. For example, the information elements may include destination and source address and port from the packet headers. Additionally, if present, the information elements may include inner destination and source address. For example, if a tunneling protocol such as General Packet Radio Service (GPRS) Tunneling Protocol (GTP) has been applied to the packets, the tapping points 108-112 may retrieve information from the inner headers of the packets. The tapping points 108-112 may also create a hash of the packet's payload or message body. For example, the hash may be a hash created using a deduplication hash function executed by the tapping points 108-112.

The latency measurer 113 may combine some or all of the information elements provided by the tapping points 108-112 to track a packet as it traverses the network. For example, the latency measurer 113 may create a correlation key by combining information elements from received copied packets. For example, for a packet from the UE 102 to the internet 106, the latency measurer may use a first set of information elements for packets from tapping points 108-110 and a second set of information elements for packets from tapping point 112. For example, for tapping points 108-110, the latency measurer may form a correlation key by concatenating the inner destination IP address, inner destination port, and the message hash. For tapping point 112, the latency measurer may form a correlation key by concatenating the outer destination IP, outer destination port, and the message hash.

Matching packets received from different tapping points that have the same correlation key reflect copies of the same packet at different points in its traversal of the network. Accordingly, by comparing the capture timestamps of matching received packets, the latency measurer 113 can determine the latency of the network from the time it takes the corresponding packet as it traverses the network. By average the results of many such packets, the latency measurer 113 may provide a measurement of the latency of the network. Additionally, by restricting the measurements to a set of tapping points, the latency measurer 113 may provide a measurement of the latency of subset of the network or of particular network elements.

In some implementations, the latency measurer 113 may provide different latency measurements for different types of packets. For example, the tapping points 108-112 may provide Quality of Service (QoS) indicators in the wrapper headers. For example, in GPRS, packets have a Differentiated Service Code Point (DSCP) field with a value from 0-63. In this example, the tapping points 108-112 may include the DSCP information element in the wrapping header. The latency measurer 113 may group measurements by QoS to provide measurements of latency for different QoS levels.

In some implementations, the latency measurer 113 may provide information to an analytics or display system 114. For example, the latency measurer 113 may provide latency data to an analytics database on system 114. For example, the system 114 may query the analytics database to display a dashboard indicating real-time or historical latency data. Additionally, the system 114 may provide interfaces to allow a user to display data for subsets or specific network elements or to configure the latency measurer 113.

In further implementations, the latency measurer 113 may perform other network measurements in addition to latency measurements. For example, the latency measurer 113 may measure network throughput at the tapping points 108-112 by measuring the rate at which packets are sent by the tapping points 108-112 to the latency measurer.

Figure 2:
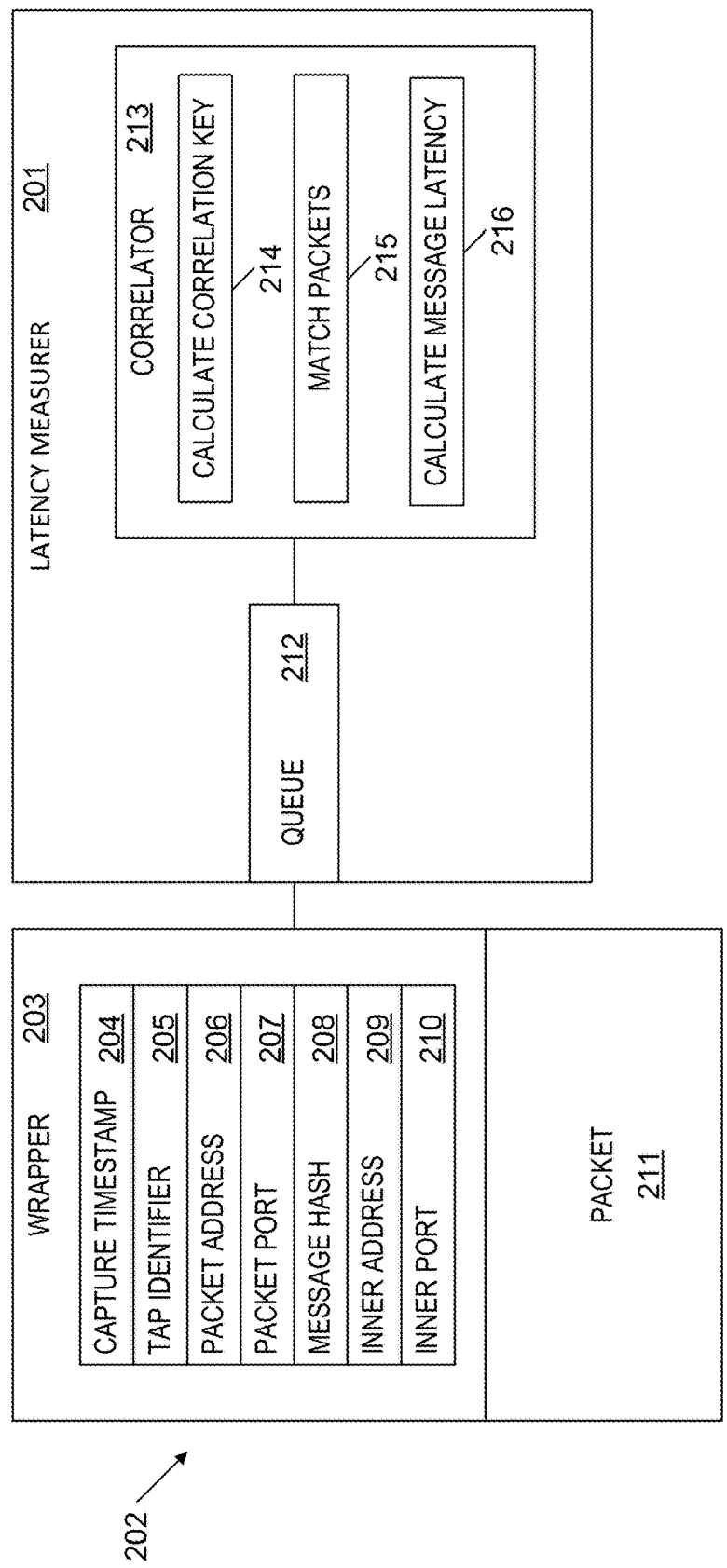
FIG. 2 illustrates an example latency measurer.

FIG. 2 illustrates an example latency measurer 201. For example, the latency measurer 201 may be deployed as a latency measurer 113 in an ePC, such as the ePC 101 of FIG. 1. Alternatively, the latency measurer 201 may be deployed in a variety of other networks, such as backbone networks, content distribution networks, or storage area networks. The latency measurer 201 may be implemented by an application run on a server or on a virtual machine. For example, the latency measurer 201 may be executed on a standard 2U server collocated in a data center with all or a portion of the network.

The latency measurer 201 may include a message queue 212 to receive wrapped packets 202 from tapping points. For example, the message queue 212 may be a queue for a latency measuring thread of a Non-Uniform Memory Access (NUMA) node. In some implementations, the message queue 212 may receive the wrapped packets via a network interface card having ports connected to the tapping points.

The wrapped packets 202 may include a copy of packet 211 received at a tapping point in the network. The wrapped packets 202 may also include a wrapper header 203. The wrapper header 203 may include a set of information elements (IEs) added by the capturing tapping point upon receiving the packet 211. For example, wrapper header 203 may include: a capture timestamp indicating when the packet was received by the tapping point; a packet address and a packet port, such as a source or destination address and port information obtained from the packet's header; a message content hash of intercepted packet's message body; and, if present, an inner address and an inner port, such as source or destination address and port information obtained from inner headers after packet encapsulation. In some implementations, the wrapper 203 may comprise a destination and source address and a destination and source port. Additionally, if present in the packet 211, the wrapper 203 may comprise an inner destination and source address and an inner destination and source port.

The latency measurer 201 may further include a correlator 213. For example, the correlator 213 may be implemented as software stored on a non-transitory computer readable medium and executed by a processor. For example, the correlator 213 may include a set of software modules 214-216 stored the non-transitory computer readable medium and executed by the processor. The correlator 213 may receive a set of wrapped packets 202 from a set of tapping points. The correlator 213 may use information from the wrapper headers 203 of the wrapped packets 202 to which received wrapped packets 202 correspond to the same packet as it traversed the network.

The correlator 213 may include a first module 214 to calculate a correlation key using wrapper header data. For example, for each of the wrapped packets, the module 214 may combine a set of information from the wrapper header 203 to form the correlation key. In some implementations, the correlator 213 may calculate the correlation key using different wrapper header data elements for different tapping points. For example, the correlator 213 may use the tap identifier 204 to determine which information elements to combine to form the correlation key.

For example, the correlator 213 may use the tap identifier 204 to determine if encapsulation has been applied to packet 211. The correlator 213 may use either: the packet address and port 206, 207; or the inner packet address and port 209, 210 in the correlation key depending on the encapsulation state of packets received at the tapping point. For example, in an EPC, such as EPC 101 of FIG. 1, for tapping points receiving encapsulated packets under GTP, such as tapping points 109, and 110, the correlation key may be a concatenation of an inner destination address 209, an inner destination port 210, and the message hash 208. In this example, for tapping points receiving unencapsulated or decapsulated packets, such as tapping points 108, 112, and 111, the correlation key may be a concatenation of an outer packet destination address 206, an outer destination port 207, and the message hash 208. After encapsulation, the outer destination address and port become the inner destination address and port. Accordingly, for the same packet passing through tapping points 108-111, each wrapped copy 202 received from each tapping point will have a matching correlation key.

As another example, the correlator 213 may use the tap identifier 204 to determine whether to use destination information, source information, or both to form the correlation key. For example, in a network segment where Network Address Translation (NAT) is applied to the source information outgoing packets, the source address and the source port may change. Accordingly, in these cases the correlator 213 may use the destination information (destination address and port) in the correlation key. As another example, in a network segment where NAT is applied to the destination information of incoming packets, the source information (source address and port) may be used in the correlation key.

The correlator 213 may include a second module 215. Module 215 may match wrapped packets 202 having matching correlation keys. As described above, wrapped packets 202 having matching correlation keys indicate that the packets 211 within the wrapper 203 are copies of the same packet as it traversed the network. Various measures may be taken to increase the probability that wrapped packets 202 having matching correlation keys do reflect copies of the same packet 211. For example, capture timestamp 204 may be used to constrain matches such that only packets received within a certain time of each other are considered match candidates. As another example, sessions may be used to determine which wrapped packets 202 are candidates to be matched using the correlation keys. This example is described in further detail with respect to FIG. 3.

The correlator 213 may include a third module 216. Module 216 may calculate a message latency through the set of set of tapping points using the capture timestamps of the matched wrapped packets. For example, module 216 may calculate the total latency through the network segment by subtracting the first capture timestamp 204 from the last capture timestamp 204 of the set of matched wrapped packets 202. As another example, module 216 may separately calculate the latency through each network element by subtracting each the immediately preceding timestamp 204 from each successive timestamp 204. The module 216 may further provide the calculated latency information to an analytics or display system, such as system 114 of FIG. 1.

Figure 3:
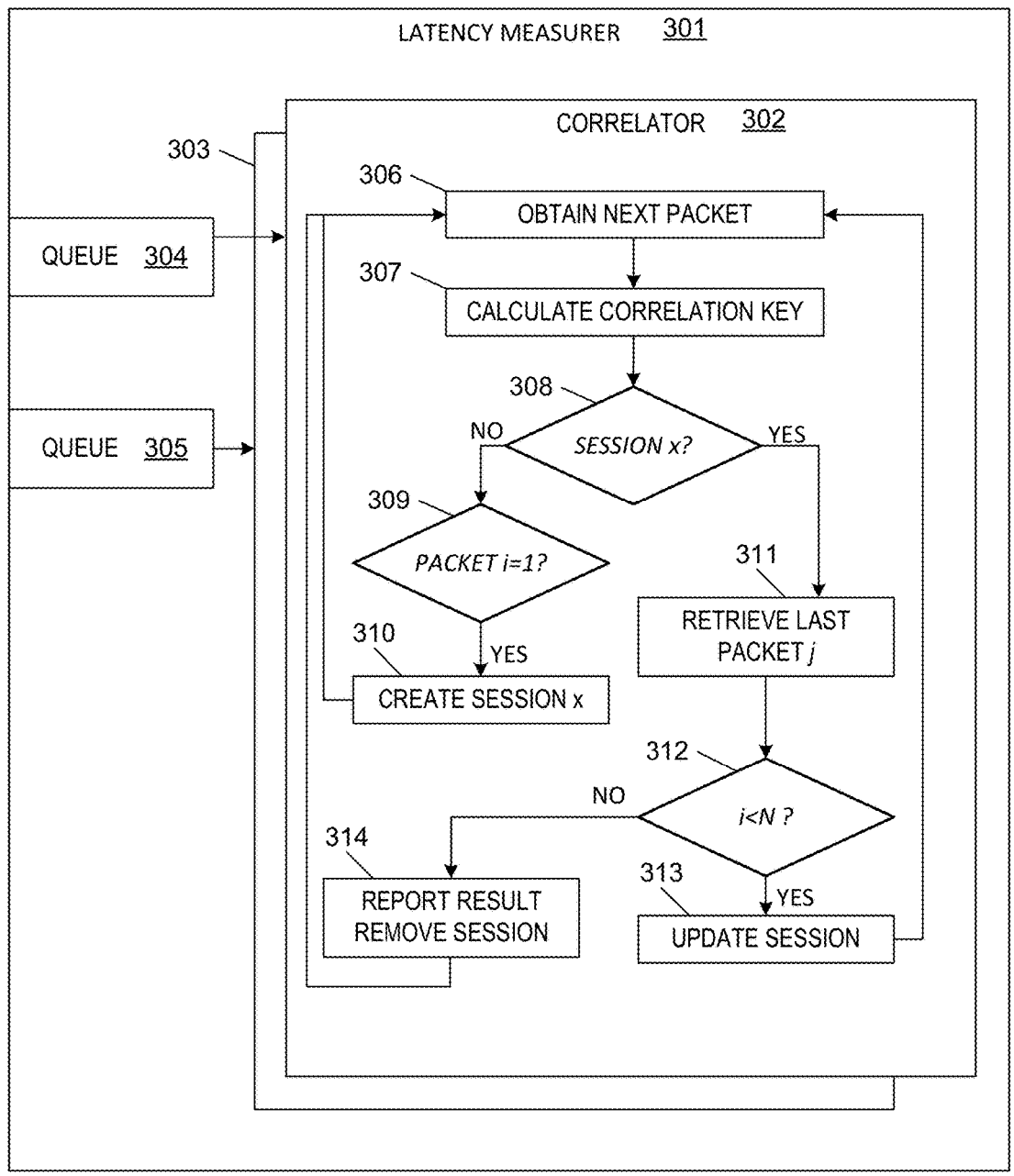
FIG. 3 illustrates an example latency measurer.

FIG. 3 illustrates an example latency measurer 301. For example, the latency measurer 301 may be 113 in an ePC, such as the ePC 101 of FIG. 1. Alternatively, the latency measurer 301 may be deployed in a variety of other networks, such as backbone networks, content distribution networks, or storage area networks. The latency measurer 301 may be implemented by an application run on a server or on a virtual machine. For example, the latency measurer 301 may be executed on a standard 2U server collocated in a data center with all or a portion of the network.

The example latency measurer may include a plurality of correlators 302, 303. For example, each correlator 302, 303 may be executed its own thread of a NUMA node. For example, the each correlator 302, 303 may execute a set of software modules 306-314 by loading corresponding instruction sets from a non-transitory computer readable medium. Each correlator 302, 303 may have an associated message queue 304, 305. For example, the message queues 304, 305 may be as described with respect to message queue 212 and may receive wrapped packets as described above.

Additionally, in some implementations, each message queue 304, 305 is associated with a distribution hash value and receives wrapped packets having the associated distribution hash value. The distribution hash value may be derived from or equal to a message content hash. A distribution hash value derived from a message content hash ensures all wrapped packets corresponding to a single packet traversing a network segment are sent to a common queue 304, 305 because a packet's message content does not change in a network segment. In these implementations, each tapping point calculates a distribution hash using packet information and transmits the wrapped packet to corresponding message queue 304, 305. For example, the distribution hash value may be a subset of message content hash values. For example, the distribution hash value for a message queue 304, 305 may be one or more of the first significant digits of message content hash values of packets sent to the corresponding message queue. For example, the distribution hash value for queue 304 might be 100, so that any packets having message content hash values matching the wildcard pattern 100*** are sent to queue 304. In further implementations, each message queue 304, 305 may be associated with a plurality of different distribution hash values. In some cases, the distribution hash values may be the same as the message content hash values, such that each message queue 304, 305 is associated with a set of possible message content hash values.

Each correlator 302, 303 may include a set of modules 306-314. For example, the modules may be software modules executed by loading instructions stored in a memory or storage shared by the correlators 302, 303.

The module 306 may obtain a wrapped packet from the corresponding message queue 304, 305. For example, module 306 may obtain wrapped packets from the queue 304 in a first-in-first-out manner such that packets are processed in the order in which they were received. For the purposes of explanation, the current wrapped packet is indexed i and referred to as packet i.

Module 307 may calculate a correlation key using wrapper header information from packet i. For example, module 307 may operate as described above with respect to module 214 of FIG. 2.

Module 308 may be configured to use the correlation key to determine whether a session x exists for packet i. For example, the correlation key may be used as a session identifier. Module 308 may use the correlation key to check whether a session x associated with correlation key exists in memory.

If session x does not exist, then the correlators 302, 303 may execute module 309. Module 309 may inspect the wrapper header to obtain the tapping point ID of the tapping point that provided the current packet. If the tapping point ID indicates that the tapping point was the first in the set of tapping points covering a measured network path, then the correlators 302, 303 may execute module 310. If not, then module 309 may cause the correlators 302, 303 to drop the packet and report an error, such as an abnormal path error.

As described below, in some implementations, module 310 may be configured to perform packet sampling by only creating packets for a proper subset of received first packets. In these implementations, module 309 may simply drop the packet i with reporting an error if the packet is not the first in the measured path. Alternatively, module 309 may only report an error if the packet is not the first and the packet otherwise meets sampling conditions. For example, if module 310 only creates sessions for the first P % of packets every Q seconds, then module 309 may only report errors if a packet i is one of the first P % packets received from the associated tapping point within the Q second time window.

Module 310 may create a session x associated with the packet. For example, module 310 may create session x by storing the current packet with the correlation key stored as a session index. In some implementations, module 310 may store additional information in the session. For example, module 310 may include a QoS indicator retrieved from packet is wrapper. For example, the QoS indicator may be a DSCP element retrieved from packet i. As another example, module 310 may create a table of wrapper information from packet i. For example, each field from the wrapper header or any subset of fields from the wrapper header may be included in a row of the table. After creating the new session, the correlator may execute module 306 to obtain the next packet and repeat the execution of the above-described modules.

In some implementations, less than all of the packets may be measured while still obtaining an accurate measurement of packet latency on the measured network path. The latency measurer 301 may apply various methods of packet sampling to reduce the number of measured packets. For example, module 309 may create sessions only for packets received within a certain time window. For example, module 309 may create sessions for the first P % of packets every Q seconds, such as the first 5% of packets every 100 ms. In additional implementations, each QoS level may be measured separately. Accordingly, the packet sampling may be applied to the different QoS levels independently. For example, module 309 may create sessions for the first P % packets of each QoS level every Q seconds.

If module 308 determines that a session exists for the packet i, then the correlators 302, 303 may execute module 311. Module 311 may retrieve a previous wrapped packet j of session x. For example, module 311 may retrieve the immediately preceding packet stored in session x. Module 311 may inspect packet j to verify that packet j came from the tapping point immediately preceding the tapping point that sent packet i. For example, module 311 may compare the tapping point IDs from packet i and j to an ordered list of the tapping IDs of the network path being measured. If the packet j came from a tapping point before the immediately preceding one, there was likely a dropped packet from the immediately preceding tapping point. If so, then module 311 may report the dropped packet and delete the session. For example, the module 311 may cause the correlator to transmit a dropped packet report to an analytics or display module or a system administrator. If not, then the correlator may execute module 312.

Module 312 may determine if the current packet i is from the last tapping point in the measured network chain (i.e., if N packets are expected from the network chain, whether i<N). For example, module 312 may use the tapping point of packet i to determine if it is from the last tapping point.

If the current packet is not the last in the chain, then the correlators 302, 303 may execute module 313. Module 313 may update session x with information from the wrapper header of packet i. For example, session x may include a running latency measurement created by summing the difference in capture timestamps between each consecutive pair of packets. In this example, module 313 may update session x by subtracting the capture timestamp of packet j from the timestamp of packet i and adding the result to the running total.

Module 313 may update session x with further information. For example, module 313 may store a copy of the wrapped packet i or the wrapper header of packet i in the session. In some cases, module 313 may overwrite the stored copy of packet j when storing packet i. As another example, module 313 may update the session table with information from packet i. In other cases, module 313 may store all packets or wrapper headers received in the session.

If the current packet is the last in the chain, then the correlators 302, 303 may execute module 314. In some implementations, module 314 may perform a final session update. For example, the module 314 may subtract the capture timestamp of packet j from packet i and sum the result to a running latency measurement. As another example, the module 314 may add wrapper header information from packet i to the session table or store the packet i as part of the session.

Module 314 may further report the session results. For example, module 314 may provide the final latency measurement to an analytics system or dashboard. Additionally, the module 314 may send further session information. For example, the module 314 may send the QoS level for the packets of the session, to allow the analytics system or dashboard to report separate latency measurements for separate QoS levels. As another example, module 314 may send the session table or the set of packets stored in the session to the analytics system or dashboard, and delete the session. In some implementations, the latency measurer 301 may have a network interface to the analytics system or dashboard, and all correlators 302, 302, may use the same interface to report their results. After reporting the session results, module 314 may delete session x and the correlator may repeat the execution of the above modules, beginning with module 306.

Figure 4:
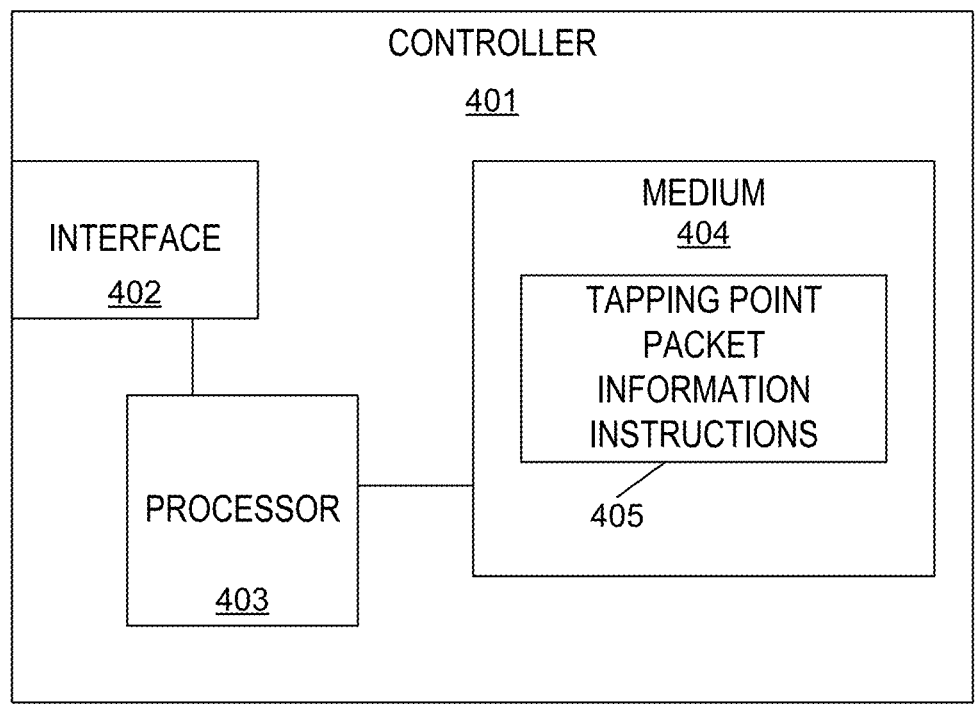
FIG. 4 illustrates an example tapping point controller.

FIG. 4 illustrates an example tapping point controller 401. The controller 401 may be any system to configure one or more tapping points on a network. For example, in a deployment where the tapping points are SDN switches, the controller 401 may be an SDN controller. As another example, the controller 401 may be implemented in a latency measurer, such as latency measurer 113, 201, or 301.

The controller 401 may include an interface 402. The interface 402 may connect to a set of tapping points to provide configuration instructions to the tapping points. For example, the interface 402 may be a network interface card to provide an out-of-band network connection to a set of tapping points deployed or being deployed in a network.

The controller 401 may further include a processor 403. For example, the processor 403 may be a central processing unit (CPU) of a computer. The controller 401 may also include a non-transitory computer readable medium 404. For example, medium 404 may comprise memory such as random access memory (RAM), storage such as hard disk or flash storage, or a combination thereof. The medium 404 may include instructions 405 that are executable by the processor 403.

Instructions set 405 may be executable by the processor 403 to configure a network tapping point via the interface 402. For example, the instructions 405 may be executable by the processor 403 to instruct a network tapping point to send packet information of a packet to a latency measurer. The packet information may include a capture timestamp; a tapping point ID, such as a port ID of the tapping point port used to capture the packet; a packet source address and a packet source port; a packet destination address and a packet destination port; and a message content hash. The instructions 405 may be further executable by the processor 403 to instruct the tapping point to send an inner source address, an inner source port, an inner destination address, and an inner destination port, if these elements are present in the packet.

The instructions 405 may be further executable by the processor 403 to instruct the tapping point to send other information. For example, the tapping point may be instructed to send a copy of the packet to the latency measurer with the packet information in a header. For example, the instructions 403 may be executable to instruct the tapping point to send a wrapped packet, such as wrapped packet 202 of FIG. 2. In further implementations, the tapping points may be instructed to include other information, such as a QoS level of the packet.

Figure 5:
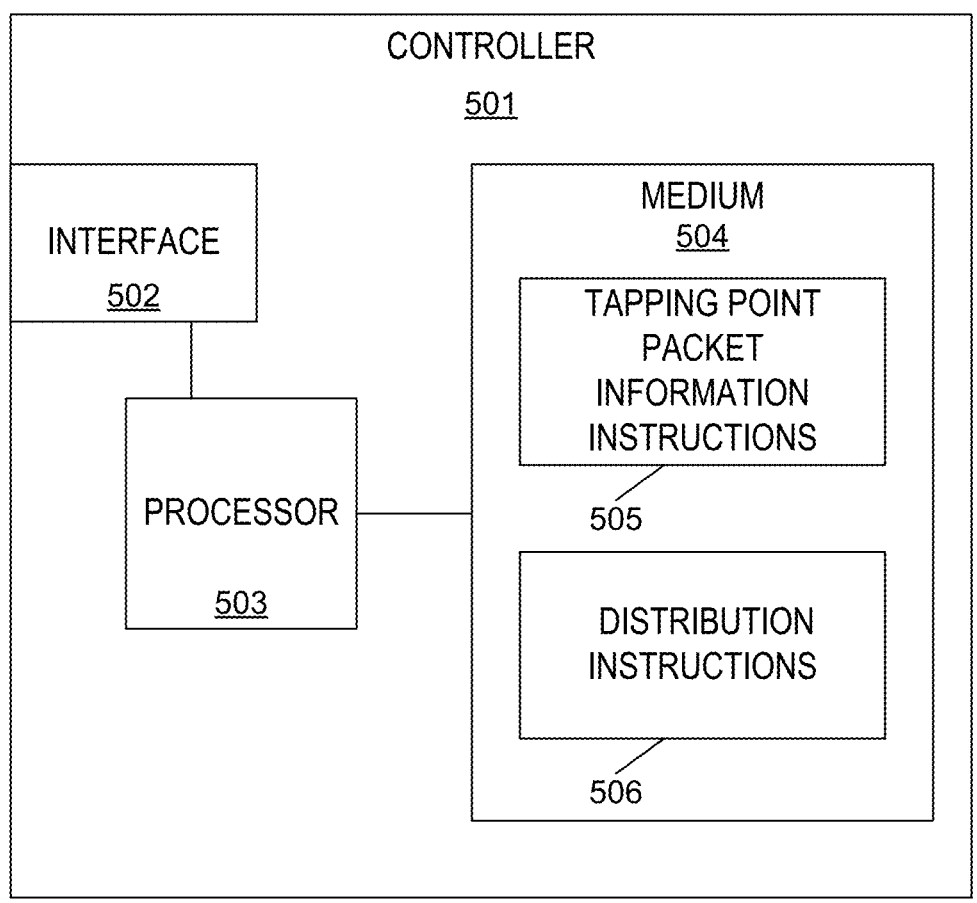
FIG. 5 illustrates an example tapping point controller.

FIG. 5 illustrates an example tapping point controller 501. The controller 501 may be any system to configure one or more tapping points on a network. For example, in a deployment where the tapping points are SDN switches, the controller 501 may be an SDN controller. As another example, the controller 501 may be implemented in a latency measurer, such as latency measurer 113, 201, or 301. The controller may include an interface 502, processor 503, and non-transitory computer readable medium 504, which may be as described with respect to interface 402, processor 403, and medium 404 as described with respect to FIG. 4.

The medium 504 may include instruction set 505. Instruction set 505 may be executable by the processor 503 to instruct a network tapping point to send packet information of a packet to a latency measurer. Instruction set 505 may be as described with respect to instruction set 405 of FIG. 4.

The medium 504 may also include instruction 506. Instruction set 506 may be executable by the processor 503 to instruct the tapping point calculate a distribution hash from message content of the packet, and transmit the packet information to a message queue based on the distribution hash. For example, the instruction to calculate a distribution hash may include information about what a hash salt or hash algorithm to use for calculating the hash value. As another example, the instructions may include a table of what distribution hash values map to which message queues. In some cases, the message queues may be identified as ports of one or more network cards on a latency measurer.

Figure 6:
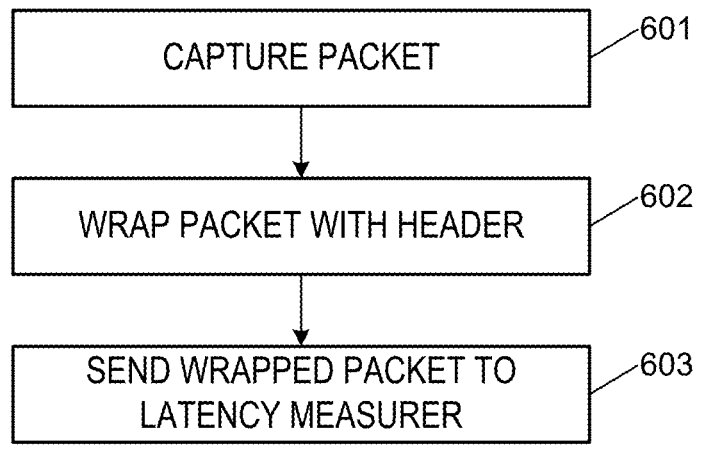
FIG. 6 illustrates an example method of operation of a network tapping point.

FIG. 6 illustrates an example method of operation of a network tapping point. For example, the example method may be performed by a network tapping point such as tapping points 108-112 described with respect to FIG. 1.

The example method includes block 601. In block 601, the tapping point may capture a packet. For example, the tapping point may intercept a packet and copy it as it traverses a network.

The example method further includes block 602. In block 602, the tapping point wraps the packet with a header. For example, the tapping point may encapsulate the packet, including adding header with packet information. The header may include a capture timestamp, a tapping point ID, a packet address and a packet port, a message content hash, and if present, an inner address and an inner port. In some cases, the packet address is a destination packet address, such as a destination IP address and the packet port is destination port ID. In these cases, the inner address and inner port may be an inner destination address and inner destination port. In these cases, the header may further include a source packet address and source port and an inner source packet address and inner source port.

The example method further includes block 603. In block 603, the tapping point sends the wrapped packet to a latency measurer. For example, the tapping point may send the wrapped packet to a message queue on an out-of-band network connection between the tapping point and the latency measurer.

Figure 7:
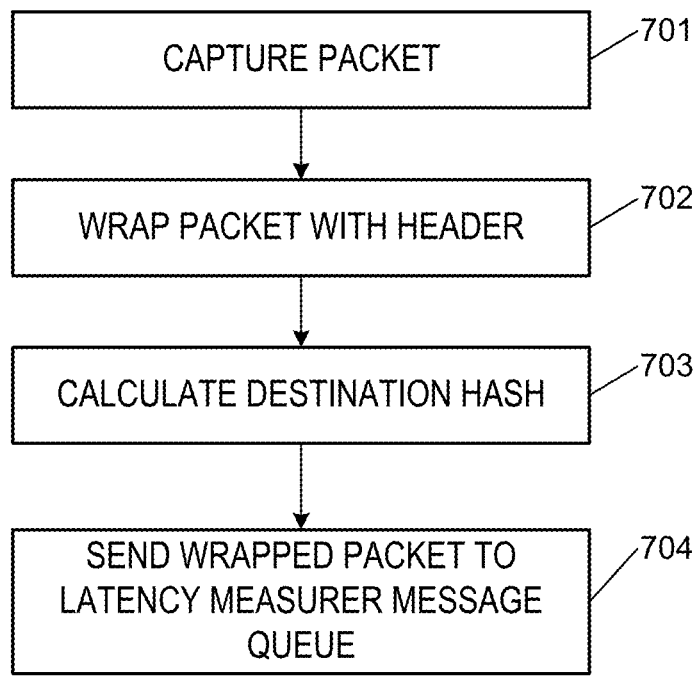
FIG. 7 illustrates an example method of operation of a network tapping point.

FIG. 7 illustrates an example method of operation of a network tapping point. For example, the example method may be performed by a network tapping point such as tapping points 108-112 described with respect to FIG. 1.

The example method includes block 701. In block 701, the tapping point may capture a packet. For example, the tapping point may intercept a packet and copy it as it traverses a network.

The example method further includes block 702. Block 702 may be performed as described with respect to block 602 of FIG. 6.

The example method further includes block 703. Block 703 may comprise calculating a distribution hash. For example, the distribution hash may be calculated by truncating the message content hash to obtain the first n significant digits of the message content hash.

The example method further includes block 704. Block 704 may comprise sending the wrapped packet to a latency measurer queue based on the distribution hash. For example, the tapping point may use a mapping of distribution hashes to message queues to determine which queue to send the wrapped packet.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system comprising:
a message queue to receive wrapped packets from tapping points, the wrapped packets each comprising a packet and a wrapper header, the wrapper header comprising:
a capture timestamp;
a tapping point identifier;
a packet address and a packet port;
a message content hash; and
if present in the packet, an inner address, and an inner port; and
a non-transitory computer readable medium including instructions executable by a processor to, for each of a set of wrapped packets received from a set of tapping points:
calculate a correlation key using wrapper header data;
match wrapped packets having matching correlation keys;
calculate a message latency through the set of set of tapping points using the capture timestamps of the matched wrapped packets, wherein the correlation key is calculated for a first wrapped packet received from a first tapping point using different wrapper header data elements than for a second wrapped packet received from a second tapping point.

2. The system of claim 1, wherein:
the packet address is a packet source address;
the packet port is a packet source port;
if present, the inner address is an inner source address, the inner port is an inner source port; and
the wrapper header further comprises:
a packet destination address;
a packet destination port; and
if present, an inner destination address and an inner destination port.

3. The system of claim 2, wherein:
for a first tapping point receiving encapsulated packets, the correlation key is a combination of the inner destination address, inner destination port, and the message content hash; and
for a second tapping point receiving decapsulated packets, the correlation key is a combination of the packet destination address, packet destination port, and the message content hash.

4. The system of claim 1, the executable instructions further to, for each wrapped packet i of the set of wrapped packets:
use the correlation key to determine whether a session exists for the wrapped packet i;
if a session does not exist and the tapping point identifier for the wrapped packet i is for a first tapping point in the set of tapping points, create the session;
if a session does exist, retrieve a previous wrapped packet of the session, update a latency measurement for the session using the difference of the capture timestamp of the current wrapped packet and the capture timestamp of the previous matched packet, and store the current matched packet associated with the session.

5. The system of claim 4, wherein the set of wrapped packets is a percentage of packets received within a time window having a common quality of service level.

6. The system of claim 1, further comprising:
a plurality of message queues, the message queue being one of the plurality, each message queue to receive wrapped packets having an associated distribution hash value.

7. The system of claim 6, wherein each of the distribution hash values is a subset of the message content hash values of the wrapped packets received by the associated message queue.

8. A method, comprising:
capturing a packet at a tapping point;
wrapping the packet with a header, the header comprising:
a capture timestamp;
a tapping point ID;
a packet address and a packet port;

a message content hash; and
if present, an inner address, and an inner port; and
sending the wrapped packet to a latency measurer;
calculating a distribution hash as a subset of the message content hash; and
sending the wrapped packet to a latency measurer queue based on the distribution hash.

9. The method of claim 8, wherein the packet address is a destination packet address, the packet port is a destination packet port, the inner address is an inner destination address, and the inner port is an inner destination port.

10. A latency measurer comprising:
a message queue to receive wrapped packets from tapping points, the wrapped packets each comprising a packet and a wrapper header, the wrapper header comprising:
a capture timestamp;
a tapping point identifier;
a packet address and a packet port;
a message content hash; and
if present in the packet, an inner address, and an inner port;
a correlator to, for each of a set of wrapped packets received from a set of tapping points:
calculate a correlation key using wrapper header data;
match wrapped packets having matching correlation keys;
calculate a message latency through the set of set of tapping points using the capture timestamps of the matched wrapped packets;
wherein the correlator is to, for each wrapped packet i of the set of wrapped packets:
use the correlation key to determine whether a session exists for the wrapped packet i;
if a session does not exist and the tapping point identifier for the wrapped packet i is for a first tapping point in the set of tapping points, create the session;
if a session does exist, retrieve a previous wrapped packet of the session, update a latency measurement for the session using the difference of the capture timestamp of the current wrapped packet and the capture timestamp of the previous matched packet, and store the current matched packet associated with the session.

11. The latency measurer of claim 10, wherein:
the packet address is a packet source address;
the packet port is a packet source port;
if present, the inner address is an inner source address, the inner port is an inner source port;
the wrapper header further comprises:
a packet destination address;
a packet destination port; and
if present, an inner destination address and an inner destination port, and
the correlator is to calculate the correlation key using different wrapper header data elements for different tapping points.

12. The latency measurer of claim 11, wherein:
for a first tapping point receiving encapsulated packets, the correlation key is a combination of the inner destination address, inner destination port, and the message content hash; and
for a second tapping point receiving decapsulated packets, the correlation key is a combination of the packet destination address, packet destination port, and the message content hash.

13. The latency measurer of claim 10, wherein the set of wrapped packets is a percentage of packets received within a time window having a common quality of service level.

14. The latency measurer of claim 10, further comprising:
a plurality of message queues, the message queue being one of the plurality, each message queue to receive wrapped packets having an associated distribution hash value.

15. The latency measurer of claim 10, each the distribution hash value is a subset of the message content hash values of the wrapped packets received by the associated message queue.

16. The latency measurer of claim 15, further comprising:
a plurality of correlators, the correlator being one of the plurality, each correlator associated with a message queue of the plurality of message queues.

* * * * *